United States Patent Office 3,187,057
Patented June 1, 1965

3,187,057
TRICHLOROMETHYL POLYMETHYL BENZENES
Hugo H. Peter, The Hague, Netherlands, and Melvern C. Hoff, Highland, Ind., assignors to Standard Oil Company, Chicago, Ill., a corporation of Indiana
No Drawing. Filed May 19, 1958, Ser. No. 735,961
10 Claims. (Cl. 260—651)

This invention relates to reactions between polyalkylbenzenes and carbon tetrachloride and particularly concerns a method for forming trichloromethyl polyalkylbenzenes.

Prior workers have attempted to prepare trichloromethylbenzene by reacting benzene with carbon tetrachloride in the presence of aluminum chloride. The reaction did not stop at the desired stage, but instead continued and produced dichlorodiarylmethane and chlorotriarylmethane. The uncontrollable nature of the reaction was also heretofore observed when toluene was used in the reaction rather than benzene. On hydrolyzing the reaction products diaryl ketones and triaryl carbinols are formed. Recent interest in polyalkylbenzoic acid for use in plasticizers, paints, varnishes, etc. poses a problem as to how to prepare such carboxylic acids.

An object of the present invention is to provide a process for producing trichloromethyl polymethylbenzenes. Another object is to provide a process which produces trichloromethyl polymethylbenzenes in good yields and at the same time minimizes or avoids the production of dichlorodiarylmethanes, chlorotriarylmethanes, tars and other undesired byproducts. A still further object is to provide a process for producing trichloromethyl polymethylbenzenes which are hydrolyzable to polymethylbenzoic acids and minimizing the formation of products which are hydrolyzable to ketones. Other objects and advantages of the present invention will be apparent from the more detailed description thereof.

In accordance with the present invention, a polyalkylbenzene such as polymethylbenzenes selected from the group consisting of mesitylene, durene, isodurene and pentamethylbenzene are agitated with carbon tetrachloride and aluminum chloride, the amount of carbon tetrachloride being in excess of one mol per mol of polyalkylbenzene. It is preferred to carry out the reaction by gradually adding the polyalkylbenzene to a mixture of aluminum chloride and carbon tetrachloride. To avoid the formation of tarry products it is desirable to employ more than two mols of aluminum chloride per mol of polyalkylbenzene. Reaction temperatures of from 0° to 100° C. may be used. After the polyalkylbenzene charge stock is converted to the trichloromethyl polyalkylbenzene, the latter can be recovered from the reaction products, or the reaction products may be hydrolyzed to form the polyalkylbenzoic acid from the trichloromethyl polyalkylbenzene.

Using mesitylene as an example polymethylbenzene, the chemical reaction involved in the present invention appears to be as follows:

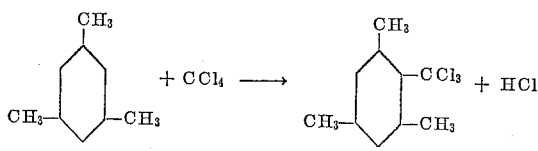

While the invention is being described herein as using polymethylbenzenes selected from the group consisting of mesitylene, durene, isodurene, pentamethylbenzene, and mixtures of such polymethylbenzenes, it is apparent that other polyalkylbenzenes whose substituents are attached in the 1,3,5- or in the 1,2,4,5- or in the 1,2,3,5-, or in the 1,2,3,4,5-position may be used. For instance, all of the substituents attached to the benzene ring may be ethyl groupings. The alkyl substituent may be an n-propyl-, isobutyl-, or tertiary butyl substituent, but with these larger alkyl substituents only one such substituent may be present in the polyalkylbenzene in order to be useable in the process of this invention. To illustrate, 1,3-dimethyl-5-tertiary butyl benzene may be used in the reaction, but 1,3,5-tri tertiary butyl benzene is not useable in the process. It is important that polyalkylbenzenes which contain their alkyl substituents in the 1,3,5-, 1,2,4,5-, 1,2,3,5-, or in the 1,2,3,4,5-positions in the benzene nucleus be used. The benzylic chlorines on the intermediate trichloromethyl aromatic are far more reactive than the competing halogens on the carbon tetrachloride. The polyalkylbenzenes which are substituted in the above defined positions provide steric protection and shelter the reactive trichloromethyl grouping in such fashion as to prevent reaction with second or even third molecules of the aromatic. To illustrate, when mesitylene is used under the preferred processing conditions an essentially quantitative yield of the trichloromethyl mesitylene can be produced. However, if benzene is used most of the product consists of dichlorodiphenylmethane and chlorotriphenylmethane.

In carrying out the reaction, it is preferred to add the polymethylbenzene to a mixture of the aluminum chloride and carbon tetrachloride. This sequence of addition of the reactants minimizes the amount of isomerization and disproportionation of the polymethylbenzene. It is particularly important to do so when using durene since the latter readily isomerizes to isodurene. The polymethylbenzene may be added gradually to the aluminum chloride-carbon tetrachloride slurry, for example over a course of 0.1 to 2 hours. The reactants are usually maintained at a temperature of from —20 to 100° C. Somewhat higher or lower temperatures may be used, however, without adverse results. Reaction times of about 1 to 2 hours are usually satisfactory although the reaction may be carried out over a shorter period of time, e.g. 0.1 hour or for as long as 10 hours or more. To avoid the formation of condensation products, dichlorodiarylmethanes, and chlorotriarylmethanes, carbon tetrachloride should be used in the reaction zone in an amount in excess of one mol of the latter per mol of introduced polymethylbenzene, e.g. a molar ratio of 2:1 to 10:1 is usually satisfactory. For this same purpose, and to avoid the formation of tar as the product, a molar ratio of aluminum chloride to polymethylbenzene of at least 2:1, e.g. 2:1 to 10:1, should be employed in the reaction zone. A high ratio of aluminum chloride to polymethylbenzene is maintained in the reaction zone also by the mode of addition of reactants which is used, i.e. by adding the polymethylbenzene gradually to a slurry of aluminum chloride and carbon tetrachloride. Maintaining a high molar excess of aluminum chloride to polymethylbenzene in the reaction zone is important in reducing and preventing the formation of tarry products.

During the course of adding the reactants, the slurry of polymethylbenzene with carbon tetrachloride and aluminum chloride is agitated. Some heat is given off during the reaction. Agitation is preferably continued during the course of the reaction. Thereafter the reaction products may be worked up to recover the trichloromethyl polymethylbenzene. Since a principal utility for these trichloromethyl polymethylbenzenes is in the formation of polyalkylbenzoic acids, the latter may be formed directly from the reaction products of this invention by adding aqueous caustic solution or other hydrolyzing media to the reaction products. The trichloromethyl polymethylbenzenes are hydrolyzed to their corresponding polyalkylbenzoic acids. These are thereafter recovered by conventional techniques such as distillation, crystallization or other suitable methods.

If a mixture of trichloromethyl polymethylbenzenes is desired, the charge polymethylbenzene may be subjected to a preceding isomerization step using an aluminum chloride catalyst, and carbon tetrachloride may then be added to the reaction zone whereupon the isomerized and/or disproportionated polymethylbenzene is converted to its corresponding trichloromethyl polymethylbenzene. For example, one mol of pseudocumene may be agitated with one to two mols of aluminum chloride and one mol of hydrogen chloride at about 80° C. for one hour, the temperature lowered to 20° C. and agitated for two more hours. The product polymethylbenzenes at this stage will consist of 60% trimethylbenzenes of which 95% is mesitylene, 20% tetramethylbenzenes of which the main portion is isodurene, and the remainder is principally xylenes. Carbon tetrachloride is then added in a molar excess based upon polymethylenzene and the reactants are agitated at about 30° C. for two hours following which the trichloromethyl derivatives of the tri- and tetramethylbenzenes may be recovered or hydrolyzed to their corresponding benzoic acids and then recovered. The individual polymethylbenzoic acids may then be separated from each other. Mixtures of trimethylbenzene can thus be isomerized to an equilibrium composition which is 90 to 95% mesitylene which may thereafter be processed in accordance with this invention. Likewise, mixtures of tetramethylbenzene may be isomerized to the equilibrium composition and thereafter reacted with the carbon tetrachloride in accordance with this invention.

A number of experiments were carried out which illustrate the present invention.

*Example 1*

Anhydrous aluminum chloride in the amount of 159 grams (1.2 mols) was mixed with 250 ml. of carbon tetrachloride (2.6 mols). While this mixture was stirred rapidly at about 30° C., 81 grams (0.5 mol) of pentamethylbenzene dissolved in 250 ml. of carbon tetrachloride was added to the aluminum chloride-carbon tetrachloride over a period of about two hours. During the addition, a steady stream of HCl gas was evolved and a dark purple complex formed. After the addition was completed, the reactants were stirred for another hour, after which time the HCl evolution practically ceased. The reaction temperature was lowered about 10° C. and 200 ml. of 10% HCl solution was added to destroy the complex. This complex disappeared after stirring. The reaction products were then contacted with sufficient water (about 200 ml.) to assure complete dissolving of the aluminum salts. The water layer was separated, and the organic layer washed repeatedly with water. Excess carbon tetrachloride was removed under reduced pressure leaving the crude intermediate trichloromethyl pentamethylbenzene. This latter product was hydrolyzed to pentamethylbenzoic acid by agitation with 120 grams (3 mols) of sodium hydroxide and 150 ml. of water. After a short induction period, light tan crystals appeared. After refluxing for three hours, the crude salt of pentamethylbenzoic acid, which is not too soluble in water, was dissolved in about 3 liters of boiling water and then filtered. The filtrate was acidified with concentrated HCl solution and the white precipitated acid was collected by filtration and dried. The yield of the crude pentamethylbenzoic acid, M.P. 205–208 (210° C. Beilstien IX, 569) was 97 grams (101% of theory). One recrystallization from aqueous methanol yielded 75 grams (78% of theory) of pentamethylbenzoic acid having a melting point of 208–209° C.

*Example 2*

60 grams (0.5 mol) of mesitylene and 150 grams (1.2 mols) of aluminum chloride were mixed, using external cooling to keep the temperature at 30° C., and HCl was passed into the mixture until a mobile dark red homogeneous solution resulted. 500 ml. (about 5.2 mols) of carbon tetrachloride was then added at a very slow rate. The reaction was carried out and the products were worked up as described in Example 1. The resulting crude mesitoic acid weighed 84 grams (102% of theory) and melted at 142–145° C. Two recrystallizations from n-heptane yielded 69 grams (84% of theory) of mesitoic acid having a melting point of 155° C. (155° C. Beilstein IX, 553).

*Example 3*

The experimental techniques described in the preceding examples were followed in a run in which a mixture of polymethylbenzenes consisting of 82% isodurene, 8% prehnitene and 10% durene was used. The tetramethylbenzene mixture together with carbon tetrachloride was slowly added to the slurry of aluminum chloride and carbon tetrachloride. The molar ratio of aluminum chloride to the total tetramethylbenzene added was 2.14:1. The reaction temperature was maintained at about 30° C. From the hydrolyzed reaction products was obtained a 53% of theory yield of mixed acids having a melting point of 123–127° C. In a companion experiment in which all conditions were held the same except that the molar ratio of aluminum chloride to the total amount of added tetramethylbenzene was 1.14:1, substantially all of the reaction product after hydrolysis consisted of a tarry material containing traces of acid. This illustrates the importance of using more than two mols of aluminum chloride per mol of polymethylbenzene added to the reaction zone, especially when using a mixture of tetramethylbenzenes. A similar experiment was carried out except that the polymethylbenzene consisted of essentially pure isodurene, the reaction temperature was 85° C., and the molar ratio of aluminum chloride to isodurene was 2.4:1. After hydrolysis, acids having a melting point of 124–126° C. were recovered in 70% of theory.

Other modifications of the present invention, besides those described herein, will be apparent from the foregoing description to those skilled in the art and are contemplated as coming within the scope of the appended claims.

What is claimed is:

1. A process for producing a trichloromethyl substituted polyalkylenbenzene which comprises reacting a member of the group consisting of trialkylbenzene and tetraalkylbenzene with a molar excess of carbon tetrachloride in the presence of aluminum chloride wherein each alkyl substituent on the benzene nucleus is a member of the group consisting of methyl and ethyl.

2. A process for preparing a trichloromethyl substituted polymethylbenzene which comprises gradually adding a polymethylbenzene selected from the group consisting of mesitylene, durene, isodurene, pentamethylbenzene, and mixtures thereof to a slurry of carbon tetrachloride and aluminum chloride, the carbon tetrachloride being present in an amount in excess of one mol per mol of polymethylbenzene and the aluminum chloride being present in the amount of at least two mols per mol of polymethylbenzene, and commingling the mixture at a temperature between about −20° and 100° C. whereby carbon tetrachloride reacts with the polymethylbenzene to form a trichloromethyl polymethylbenzene.

3. The process of claim 2 wherein the polymethylbenzene is mesitylene.

4. The process of claim 2 wherein the polymethylbenzene is pentamethylbenzene.

5. The process of claim 2 wherein a polymethylbenzene mixture comprised of durene and isodurene is used.

6. A process for preparing a trichloromethyl substituted polymethylbenzene which comprsies commingling a polymethylbenzene selected from the group consisting of mesitylene, durene, isodurene, pentamethylbenzene, and mixtures thereof with carbon tetrachloride in an amount in excess of one mol per mol of polymethylbenzene and with aluminum chloride in an amount in excess of two mols of aluminum chloride based upon polymethylbenzene at a temperature between about −20° and 100° C., and thereby introducing a trichloromethyl radical into a non-substituted position in the aromatic ring of the polymethylbenzene and forming a trichloromethyl polymethylbenzene.

7. As a new composition of matter, a ring-substituted trichloromethyl derivative of a polymethylbenzene selected from the group consisting of mesitylene, durene, isodurene, and pentamethylbenzene.

8. Trichloromethyl pentamethylbenzene.

9. Trichloromethyl mesitylene.

10. Trichloromethyl isodurene.

References Cited by the Examiner

Wagner et al.: "Synthetic Organic Chemistry," 2nd ed., John Wiley & Sons (1953), p. 418 relied on. (Copy in Sci. Library.)

LEON ZITVER, *Primary Examiner.*

ALLAN M. BOETTCHER, ALPHONSO D. SULLIVAN,
*Examiners.*